United States Patent [19]

Scholl et al.

[11] 4,198,487

[45] Apr. 15, 1980

[54] PROCESS FOR THE PRODUCTION OF INORGANIC-ORGANIC SYNTHETIC FOAM MATERIALS

[75] Inventors: Hans-Joachim Scholl, Cologne; Dieter Dieterich, Leverkusen, both of Fed. Rep. of Germany; Peter Markusch, New Martinsville, W. Va.; Rainer Welte, Leverkusen, Fed. Rep. of Germany

[73] Assignee: Bayer Aktiengesellschaft, Leverkusen, Fed. Rep. of Germany

[21] Appl. No.: 930,123

[22] Filed: Aug. 1, 1978

[30] Foreign Application Priority Data

Aug. 2, 1977 [DE] Fed. Rep. of Germany ....... 2734690

[51] Int. Cl.$^2$ ..................... C08G 18/14; C08G 18/08; C08G 18/30
[52] U.S. Cl. ................................. 521/122; 521/123; 521/175; 521/137; 521/162; 521/65; 528/71
[58] Field of Search ................ 528/71; 521/131, 122, 521/65, 162, 125, 123, 137

[56] References Cited

U.S. PATENT DOCUMENTS

| | | | |
|---|---|---|---|
| 3,826,769 | 7/1974 | Carlson | 528/71 |
| 3,975,316 | 8/1976 | Villa | 521/122 |
| 3,983,081 | 9/1976 | Dieterich et al. | 528/71 |
| 4,052,347 | 10/1977 | Dieterich et al. | 260/2.5 AK |
| 4,057,519 | 11/1977 | Summers et al. | 521/131 |
| 4,097,423 | 6/1978 | Dieterich | 521/162 |
| 4,105,594 | 8/1978 | Dieterich et al. | 521/162 |
| 4,129,696 | 12/1978 | Markusch et al. | 521/162 |

OTHER PUBLICATIONS

D.O.S. 1,770,384, Wiegand et al., Oct. 14, 1971.

*Primary Examiner*—H. S. Cockeram
*Attorney, Agent, or Firm*—Gene Harsh; Joseph C. Gil

[57] ABSTRACT

The instant invention is directed to a process for the production of inorganic-organic synthetic materials having high strength, elasticity, dimensional stability under heat, and flame resistance, consisting of a polymer-polysilicic acid gel composite material in the form of a solid/solid xerosol, said process comprising mixing (a) an organic polyisocyanate,
(b) an aqueous basic solution and/or an aqueous basic suspension having an inorganic solid content of from 20 to 80% by weight, preferably from 30 to 70% by weight,
(c) an organic compound containing at least one isocyanate reactive hydrogen atom and at least one non-ionic-hydrophilic group and
(d) optionally catalysts and other additives and leaving the resulting mixture to react, characterized in that components (a) and (b), optionally with the addition of part or all of component (d) are first mixed together to form a stable primary dispersion and thereafter component (c), optionally with the addition of all or part of component (d), is added to form the final dispersion.

8 Claims, No Drawings

PROCESS FOR THE PRODUCTION OF INORGANIC-ORGANIC SYNTHETIC FOAM MATERIALS

BACKGROUND OF THE INVENTION

Inorganic-organic synthetic materials based on polyisocyanates and aqueous alkali metal silicate solutions are already known and are described, for example, in German Offenlegungsschrift 1,770,384; U.S. application Ser. No. 527,476 now U.S. Pat. No. 4,097,423, filed Nov. 26, 1974, U.S. application Ser. No. 527,478 now abandoned, filed Nov. 26, 1974, and U.S. Pat. Nos. 3,965,051, 3,981,831, 3,985,929, 4,042,536 and 4,052,347.

It is possible in this way to produce synthetic materials which, by virtue of their inorganic content, are more fire resistant than purely organic materials particularly in their fire resistance. They may be foamed or unfoamed, hard or soft, brittle or flexible materials, depending upon their composition and the reaction conditions. These inorganic-organic synthetic materials are suitable for a wide range of possible applications, because of the great variability of their properties.

Common to all of these materials in the fact that to produce them, the organic phase and the inorganic phase must be mixed together. W/O (water-in-oil) or O/W (oil-in-water) dispersions are thereby formed. Those synthetic materials which are obtained from a W/O type of dispersion are particularly interesting. They have high mechanical strengths even when exposed to moisture because the hardened, continuous organic phase envelops and thereby fixes the aqueous, inorganic discontinuous phase which is also hardened. The improved fire resistance of such systems also depends on the perfectly continuous organic phase of these materials, due to the water enclosed by this phase.

Attempts have been made to produce the synthetic materials described above by mixing the reactants in an intermittently or continuously operating mixing apparatus in either one or more stages and then leaving the resulting dispersion to solidify.

Thus, according to U.S. Pat. No. 4,042,536, for example, mixing of
 (a) an organic polyisocyanate,
 (b) an aqueous silicate solution and
 (c) an organic component
is carried out by first preparing a preliminary mixture of (b) and (c) or by mixing (a), (b) and (c) all together.

This method, however, frequently gives rise to products which have increased degrees of defects as the proportion of organic component increases. In the extreme case, the formation of a regular structure of an inorganic-organic synthetic material may be prevented.

It is an object of the present invention to obviate the disadvantages described above and to provide a process by which inorganic-organic synthetic materials can be produced problem-free even with high proportions of organic constituents.

These problems are solved by the process according to the invention.

DESCRIPTION OF THE INVENTION

The present invention thus relates to a process for the production of inorganic-organic synthetic materials characterized by high strength, elasticity, dimensional stability under heat, and flame resistance, consisting of a polymer-polysilicic acid gel composite material in the form of a solid/solid xerosol comprising mixing
 (a) an organic polyisocyanate,
 (b) an aqueous basic solution and/or an aqueous basic suspension having an inorganic solids content of from 20 to 80% by weight, and preferably from 30 to 70% by weight,
 (c) an organic compound containing at least one isocyanate reactive hydrogen atom and at least one non-ionic hydrophilic group and
 (d) optionally catalysts and other additives
and allowing the resulting mixture to react, characterized in that mixing is carried out by first combining components (a) and (b), to form a stable primary dispersion and then adding component (c), to form the final dispersion. Component (d) may be added in toto or in part to either components (a) and (b) and/or to component (c).

According to the invention, the final dispersion preferably has a viscosity range of 100 to 4000 cP at room temperature before it begins to harden and contains from 10 to 50% by weight of inorganic aqueous phase and from 90 to 50% by weight of organic phase.

The process according to the invention may be carried out continuously or, preferably, batchwise. In the batchwise process, the stable primary dispersion of polyisocyanate, aqueous basic solution or suspension and optionally other additives such as activators, emulsifiers and blowing agents is first prepared and the organic compound, component (c), is then added. In the continuous method, a special arrangement of machinery is provided so that the primary dispersion is first produced in a preliminary chamber in the same way as in the batchwise method and this dispersion is then continuously mixed with the organic compound, component (c), in a mixing area following this chamber.

The batchwise variation of the process is recommended when organic compounds of the kind which cause spontaneous gelling of, for example, aqueous alkali metal silicate solutions are used as component (c). In such a case, a stable primary dispersion is preferably first prepared from the polyisocyanate and, for example, aqueous alkali metal silicate, and component (c) is added subsequently.

Longer mixing times, which are often desired, can be obtained in the intermittent method if the catalyst of component (d) suitable for hardening is added only after preparation of the stable primary dispersion.

Organic compounds to be used as component (c) which do not gel aqueous alkali metal silicates or do so only very slowly are suitable both for the continuous and for the intermittent process.

According to the invention, mixing of the individual components may be carried out, for example, in the following sequence: A dispersion is first prepared from components (a) and (b), optionally with the addition of all or part of component (d), with the aid of a mixing apparatus. Component (c), optionally with the addition of all or part of component (d), is then added to this dispersion in a mixing apparatus arranged after the first mixing apparatus.

For carrying out this successive mixing on a commercial scale, the following machinery arrangements can be used:
 (1) Two agitators with mixing heads;
 (2) Two mixing assemblies consisting of two mixing devices mounted one after the other on a driven shaft, components (a) and (b), and optionally (d), being fed in at the top end of the driven shaft and component (c), and optionally (d), in the lower part of the shaft;

(3) Mixing assemblies consisting of two static mixing apparatus arranged one behind the other; components (a) and (b), and optionally (d), being fed into the first static mixer and, after passing through the first mixing path, they are mixed with component (c), and optionally (d), in the second static mixer;

(4) An agitator with mixing head as first mixing apparatus and a static mixer as second mixing apparatus; and, (5) A static mixer as the first mixing apparatus and an agitator with mixing head as the second mixing apparatus.

The polyisocyanates used as starting components according to the invention, i.e., component (a), may be aliphatic, cycloaliphatic, araliphatic, aromatic or heterocyclic polyisocyanates such as those described, for example, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane such as described in German Auslegeschrift No. 1,202,785 and U.S. Pat. No. 3,401,190; hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyanate; triphenylmethane-4,4',4''-triisocyanate; polyphenyl-polymethylene polyisocyanates which can be obtained by aniline-formaldehyde condensation followed by phosgenation and which have been described, for example, in British Pat. Nos. 874,430 and 848,671; m- and p-isocyanatophenylsulphonyl isocyanates as described in U.S. Pat. No. 3,454,606; perchlorinated aryl polyisocyanates such as those described, for example, in German Auslegeschrift No. 1,157,601 and U.S. Pat. No. 3,277,138; polyisocyanates having carbodiimide groups, such as described in German Pat. No. 1,092,007 and U.S. Pat. No. 3,152,162; diisocyanates of the type described in U.S. Pat. No. 3,492,330; polyisocyanates with allophanate groups such as described, e.g., in British Pat. No. 994,890, Belgian Pat. No. 761,626 and published Dutch patent application No. 7,102,524; polyisocyanates with isocyanurate groups, e.g., such as described in U.S. Pat. No. 3,001,973, German Pat. Nos. 1,022,789, 1,222,067 and 1,027,394, and German Offenlegungsschriften 1,929,034 and No. 2,004,048; polyisocyanates with urethane groups as described e.g. in Belgian Pat. No. 752,261 and U.S. Pat. No. 3,394,164; polyisocyanates with acylated urea groups as described in German Pat. No. 1,230,778; polyisocyanates with biuret groups such as described e.g. in German Pat. No. 1,101,394, U.S. Pat. Nos. 3,124,605 and 3,201,372 and British Pat. No. 889,050; polyisocyanates prepared by telomerization reactions as described for example, in U.S. Pat. No. 3,653,106; polyisocyanates having ester groups, such as those described, for example, in British Pat. No. 965,474 and 1,072,956, U.S. Pat. No. 3,567,763 and German Pat. No. 1,231,688; reaction products of the above mentioned isocyanates with acetals as described in German Pat. No. 1,072,385; and polyisocyanates containing polymeric fatty acid groups as described in U.S. Pat. No. 3,455,883.

The distillation residues obtained from the commercial production of isocyanates and still containing isocyanate groups may also be used, optionally as solutions in one or more of the above mentioned polyisocyanates. Mixtures of any of the above mentioned polyisocyanates may also be used.

As a general rule it is particularly preferred to use readily available polyisocyanates such as tolylene-2,4-diisocyanate and -2,6-diisocyanate and mixtures of these isomers ("TDI"); polyphenyl-polymethylene polyisocyanates of the kind which can be prepared by aniline-formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

According to the invention, it is particularly preferred to use polyisocyanates with ionic groups, such as the polyisocyanates described in U.S. application Ser. No. 527,476, filed Nov. 26, 1974; sulphonated polyisocyanates as described in German Offenlegungsschrift 2,359,614 and U.S. Pat. No. 3,959,329 and polyisocyanates with carboxylate groups as described in U.S. Pat. No. 3,959,348. Nonionic-hydrophilic polyisocyanates of the kind described in German Offenlegungsschrift No. 2,325,090, polyisocyanates with polar groups as described in U.S. application Ser. No. 527,478, filed Nov. 26, 1974; and polyisocyanates with phenolic hydroxyl groups such as those described in U.S. application Ser. No. 527,476 are also particularly preferred according to the invention.

The above mentioned, particularly preferred polyisocyanates are preferably prepared from polyphenyl-polymethylene polyisocyanates of the kind obtained by anilineformaldehyde condensation followed by phosgenation ("crude MDI") and from the distillation residues which are obtained from these products by distilling off the dinuclear products and which generally have a viscosity of between 50 and 50,000 P/25° C., an isocyanate content of 28 to 33% by weight and a functionality of greater than 2.

The starting components used as component (b) according to the invention are aqueous basic solutions or suspensions having an inorganic solids content of from 20 to 80% by weight, preferably from 30 to 70% by weight. They are preferably aqueous alkali metal silicate solutions or alkali-stabilized silica sols but also include liquid basic suspensions of finely divided fillers. The above mentioned aqueous basic solutions or suspensions are frequently also used in combination.

By aqueous solutions of alkali metal silicates are meant the solutions in water of sodium and/or potassium silicate which are generally referred to as "waterglass". Crude commercial solutions which may in addition contain e.g. calcium silicate, magnesium silicate, borates and aluminates may also be used. It is preferred to use sodium silicate solutions at a concentration of 32 to 54% by weight containing a molar ratio of $Na_2O/SiO_2$ of from 1:1.6 to 1:3.3.

The organic compounds used as component (c), which are preferably liquid at room temperature, are compounds which have at least one nonionic-hydrophilic group in addition to at least one isocyanate reactive hydrogen atom.

The nonionic-hydrophilic groups are mainly hydrophilic polyether groups. The polyether groups are preferably synthesized from ethylene oxide and/or propylene oxide.

Suitable organic compounds which have at least one nonionic-hydrophilic group in addition to an isocyanate reactive hydrogen atom are, in particular, polyethers which have been obtained from alcohols with a functionality of 1-3 and ethylene oxide and/or propylene oxide and which contain hydroxyl end groups.

The hydrophilic center may also be introduced by chemically fixing a glycol such as triethylene or tetraethylene glycol into the organic compound.

Organic compounds containing polyether or polyether groups which have been synthesized in some other manner, may, of course, also be used, provided that, in addition to at least one reactive hydrogen atom, they contain hydrophilic groups, e.g. monofunctional polyethers based on monohydric alcohols and ethylene oxide. The ethylene oxide content in the polyether should preferably amount to at least 10% by weight.

Non-ionic hydrophilic compounds which are suitable according to the invention also include polycarbonates based on ethylene glycol, propylene glycol or tetraethylene glycol. Formose is also suitable, e.g. the compound described in German Offenlegungsschriften Nos. 2,639,084; 2,639,083; 2,714,084; 2,714,104; 2,721,186 and 2,721,093.

Compounds which contain a hydrophilic polyester segment, e.g. triethylene glycol or diethylene glycol and succinic acid or oxalic acid are also suitable. Segments of this type can be destroyed during the subsequent reaction with waterglass, with the result that the inorganic component hardens and the organic component becomes hydrophobic.

Polyethers which are synthesized from amines with a functionality of 1 to 4 and ethylene oxide and/or propylene oxide and which have hydroxyl groups are also suitable, particularly for the batchwise process.

Readily volatile organic substances may be used according to the invention as blowing agents. Suitable organic blowing agents include e.g. acetone, ethyl acetate, halogen substituted alkanes such as methylene chloride, chloroform, ethylidene chloride, vinylidene chloride, monofluorotrichloromethane, chlorodifluoromethane or dichlorodifluoromethane; or butane, hexane, heptane or diethylether. The effect of a blowing agent may also be obtained by the addition of compounds which decompose at temperatures above room temperature to release gases, for example nitrogen, e.g. azo compounds such as azoisobutyric acid nitrile.

Water contained in the aqueous basic solution or suspension may also take over the function of blowing agent. Fine metal powders, e.g. calcium, magnesium, aluminum or zinc may also act as blowing agents by causing the evolution of hydrogen if the waterglass is sufficiently alkaline. They also have a hardening and reinforcing action.

Catalysts are also frequently used according to the invention. Known catalysts may be used, for example tertiary amines such as triethylamine, tributylamine, N-methyl-morpholine, N-ethyl-morpholine, N-cocomorpholine, N,N,N',N'-tetramethylethylenediamine, 1,4-diazabicyclo(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethyl-cyclohexylamine, N,N,N',N'-tetramethyl-1,3-butanediamine, N,N-dimethyl-β-phenylethylamine, 1,2-dimethylimidazole, 2-methylimidazole and particularly also hexahydrotriazine derivatives.

Tertiary amines which have isocyanate reactive hydrogen atoms may also be used. Examples include triethanolamine, triisopropanolamine, N-methyl-diethanolamine, N-ethyl-diethanolamine, N,N-dimethylethanolamine and their reaction products with alkylene oxides such as propylene oxide and/or ethylene oxide.

Silaamines which have carbon-silicon bonds may also be used as catalysts, e.g. the compounds described in German Pat. No. 1,229,290, such as 2,2,4-trimethyl-2-silamorpholine and 1,3-diethylaminomethyl-tetramethyldisiloxane.

Nitrogen-containing bases such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable.

Organic metal compounds may also be used as catalysts according to the invention. Particularly preferred are organic tin compounds. The organic tin compounds used are preferably tin(II) salts of carboxylic acids, such as tin(II) acetate, tin(II) octoate, tin(II) ethyl hexoate and tin(II) laurate and the dialkyl tin salts of carboxylic acids, e.g. dibutyl tin diacetate, dibutyl tin dilaurate, dibutyl tin maleate or dioctyl tin diacetate.

Other examples of catalysts which may be used according to the invention and details concerning the activity of the catalysts are known and are described, e.g., in Kunststoff-Handbuch, Volume VII, published by Vieweg and Höchtlen, Carl-Hanser-Verlag, Munich, 1966, pages 96 to 102.

The catalysts are generally used in a quantity of between about 0.001 and 10% by weight, based on the quantity of isocyanate.

Surface active additives such as emulsifiers and foam stabilizers may also be used according to the invention. The emulsifiers used may be, for example, sodium salts of ricinoleic sulphonates, sodium salts of sulphonated paraffins or of fatty acids, or salts of fatty acids with amines, such as oleic acid diethylamine or stearic acid diethanolamine. Alkali metal or ammonium salts of sulphonic acids, such as dodecylbenzene sulphonic acid or dinaphthylmethane sulphonic acid or of fatty acids such as ricinoleic acid or of polymeric fatty acids may also be used as surface active additives.

Suitable foam stabilizers are particularly the water-soluble polyether siloxanes. These compounds generally have a polydimethylsiloxane group attached to a copolymer of ethylene oxide and propylene oxide. Foam stabilizers of this type have been described, for example, in U.S. Pat. No. 2,764,565.

Other additives which may also be used according to the invention include reaction retarders, e.g. substances which are acid in reaction such as hydrochloric acid or organic acid halides; cell regulators known per se such as paraffins or fatty alcohols or dimethyl polysiloxanes; pigments; dyes; flame retarding agents known per se such as tris-chloroethylphosphate, ammonium phosphate and polyphosphate, inorganic salts of phosphoric acid and chlorinated paraffins; stabilizers against ageing and weathering; plasticizers; fungistatic and bacteriostatic substances; and fillers such as barium sulphate, kieselguhr, carbon black or whiting.

Other examples of surface-active additives, foam stabilizers, cell regulators, reaction retarders, stabilizers, flame retarding substances, plasticizers, dyes, fillers and fungistatic and bacteriostatic substances which may be used according to the invention and details concerning the use and mode of action of these additives may be found in Kunstsoff-Handbuch, Volume VII, published by Vieweg and Höchtlen, Carl-Hanser-Verlag, Munich 1966, pages 103 to 113. Mixing of the reaction components is preferably carried out at room temperature. From the proportions of 10 to 50% by weight of inorganic aqueous phase and 90 to 50% by weight of organic phase, it is clear that the proportions of the components used in the reaction according to the invention are not critical.

To assess the commercial advantages of the instant invention, it is assumed that the primary dispersion first prepared by the process of the invention is extremely stable and that further additives do not jeopardize this stable state during the period of reaction and hardening. According to the known state of the art, on the other hand, one generally obtains dispersions which, as the porportion of organic components in them increases, undergo a change in the W/O phase structure and pass through unstable states of dispersion which may give rise to disturbances in the structure of the inorganic-organic synthetic material after hardening. The reason for this is that when organic substances are introduced by the conventional mixing methods, they may initiate processes of separation of the components of a mixture and thereby prevent the production of commercially useful inorganic-organic synthetic materials. It is regarded as likely that such states gel the inorganic phase and/or that sufficient mixing of the organic and inorganic phase fails to take place due to premature cross-linking reactions with the polyisocyanate.

The products of the process may be used in the usual fields for organic-inorganic synthetic materials, e.g. as sound and heat insulating materials, as building materials and as concrete and grouting compositions.

EXAMPLES (Percentage figures given denote percentages by weight unless otherwise indicated).
Starting materials:

(a) Polyisocyanate components $A_1$: Diisocyanatodiphenylmethane is distilled off a crude phosgenation product of an aniline-formaldehyde condensate until the distillation residue has a viscosity of 400 cP at 25° C. (dinuclear content: 45.1% by weight, trinuclear content: 22.3% by weight, high nuclear polyisocyanates; 32.6% by weight) isocyanate content: 30 to 31% by weight.

$A_2$: $A_1$ which has been sulphonated with gaseous sulphur trioxide (sulphur content: 0.96%, isocyanate content: 30.5%, viscosity at 25° C.; 24,000 cP, preparation according to U.S. Pat. No. 3,959,329.

$A_3$: $A_1$ which has been sulphonated with chlorosulphonic acid (sulphur content: 0.9%, isocyanate content: 30.2%, viscosity at 20° C.: 2000 cP).

(b) Silicate components $B_1$: Sodium waterglass, 44% solids content, molecular weight ratio $Na_2O:SiO_2=1:2$
$B_2$: Sodium waterglass, 51% solids content, molecular weight ratio $Na_2O:SiO_2=1:2$
$B_3$: Sodium waterglass, 48.6% solids content, molecular weight ratio $Na_2O:SiO_2=1:2$ (c) Polyether $C_1$: Polyethylene monoalcohol started on n-butanol, hydroxyl number: 49.2
$C_2$: Polyethylene oxide-polypropylene oxide trialcohol: addition product of 37% by weight of propylene oxide (PO), then 10% by weight of ethylene oxide (EO), then 48% by weight of PO and 5% by weight of EO started on glycerol hydroxyl number: 56
$C_3$: Polypropylene alcohol started on saccharose (87,4 OH %)/TMP (6,4 OH %)/$H_2O$ (6,2 OH %) hydroxyl number: 380
$C_4$: Polypropylene tetraaalcohol started on ethylene diamine hydroxyl number: 630
$C_5$: 2.5 parts by weight of $C_1$+7.5 parts by weight of $C_4$
$C_6$: 5 parts of $C_1$+10 parts of $C_4$ (d) Formose (prepared according to German Offenelegungsschrift No. 2,721,186).

$D_1$: 14.5% water; acid number 9.7; hydroxyl number 724

(e) Suspension

Preparation of a chalk suspension $E_1$: 240 g of a chalk (specific gravity: 2.7, 90% of the particles <2μ, Omyalite 90 of Omya GmbH) were suspended in 80 g of water and 5 g of a 30% aqueous solution of a high molecular weight dipotassium salt of a copolymer of maleic acid and styrene with carboxylate and sulphonate groups. Solids content: 75%.

EXAMPLE 1

| | |
|---|---|
| 100 g of polyisocyanate $A_1$ | Component I |
| 300 g of silicate component $B_1$ | |
| 5 g of polyether $C_1$ | Component II |
| 5 g of polyether $C_2$ | |
| 15 g of tris-(β-chloroethyl)-phosphate | |
| 0.2 g of stabilizer OS-710 (Polyether siloxane of Bayer AG) | |
| 3 g of dimethylbenzylamine | Component III |
| 1 g of amine catalyst (consisting of 75% by weight of N,N-dimethyl aminoethanol and 25% by weight of diazobicyclooctane) | |
| 25 g of trichlorofluoromethane | |

Components II and III were first mixed. Component I was mixed with a high speed stirrer for 10 seconds to form the primary dispersion and the previously prepared mixture of components II+III was added within 5 seconds with stirring. After a total mixing time of 20 seconds, the reaction mixture was poured out into paper packets. It began to foam up after 30 seconds and had solidified after 85 seconds. A tough elastic inorganic-organic lightweight foam having a gross density of 48 kg/m³ and a compression resistance of 0.07 (MPa) was obtained.

Comparison Example

Conventional mixing of all three of the components of Example 1 at the same time results in a foam which is not suitable for use and has faults, with a wet, defoamed bottom zone. These phenomena of disintegration in the region of the bottom zone are obviously due to insufficient mixing of the individual components.

EXAMPLE 2

| | |
|---|---|
| 100 g of polyisocyanate $A_1$ | } Component I |
| 200 g of silicate component $B_1$ | |
| 5 g of polyether $C_1$ | } Component II |
| 5 g of polyether $C_2$ | |
| 15 g of tris-($\beta$-chloroethyl)-phosphate | |
| 0.5 g of stabilizer L 5340 (polyether siloxane of Union Carbide Corp.) | |
| 3 g of dimethylbenzylamine | } Component III |
| 1 g of amine catalyst according to Example 1 | |
| 25 g of trichlorofluoromethane | |

Foaming was carried out as in Example 1. The foaming process set in after 28 seconds and the reaction mixture was solidified after 75 seconds.

Gross density [kg/m$^3$]: 34 Compression resistance (MPa): 0.06

The symbols in the following Examples have the following meaning:
- $t_R$ = stirring time, time of mixing the mixture of component I, component II and component III
- $t_L$ = resting time, time from beginning of mixing to beginning of foaming
- $t_A$ = gel time, time from beginning of mixing to hardening.

EXAMPLE 3

Example 2 was repeated with an additional 3 g of polyether $C_3$ in component II. A lightweight foam characterized by the following data was obtained:

$t_R$: 20 sec., $t_L$: 33 sec., $t_A$: 85 sec. Gross density [kg/m$^3$]: 29 Compression resistance [MPa]: 0.04

EXAMPLE 4

| | |
|---|---|
| 100 g of polyisocyanate $A_1$ | } Component I |
| 300 g of silicate component $B_1$ | |
| 5 g of polyether $C_1$ | } Component II |
| 5 g of polyether $C_2$ | |
| 15 g of tris-($\beta$-chloroethyl)-phosphate | } Component III |
| 0.5 g of stabilizer L 5340 of Example 2 | |
| 3.0 g of dimethylbenzylamine | |
| 1.0 g of amine catalyst of Example 1 | } Component III |
| 30 g of trichlorofluoromethane | |

Foaming was carried out as in Example 1. A lightweight foam characterized by the following data was obtained:

$t_R$: 20 sec., $t_L$: 40 sec., $t_A$: 105 sec. Gross density [kg/m$^3$]: 42 Compression resistance [MPa]: 0.07

EXAMPLE 5

| | |
|---|---|
| 100 g of polyisocyanate $A_1$ | |

-continued

| | |
|---|---|
| | } Component I |
| 300 g of silicate component $B_3$ | |
| 5 g of polyether $C_1$ | } Component II |
| 5 g of polyether $C_2$ | |
| 15 g of tris-($\beta$-chloroethyl)-phosphate | |
| 0.5 g of stabilizer L 5340 according to Example 2 | |
| 1.5 g of dimethylbenzylamine | } Component III |
| 1.0 g of amine catalyst according to Example 1 | |
| 30 g of trichlorofluoromethane | |

Foaming was carried out according to Example 1.

$t_R$: 20 sec., $t_L$: 39 sec., $t_A$: 105 sec. Gross density [kg/m$^3$]: 50 Compression resistance [MPa]: 0.09

EXAMPLE 6

| | |
|---|---|
| 100 g of polyisocyanate $A_1$ | |
| 300 g of silicate component $B_1$ | } Component I |
| 100 g of alumina cement "Lafarge Fondu" | |
| 5 g of polyether $C_1$ | } Component II |
| 5 g of polyether $C_2$ | |
| 15 g of tris-($\beta$-chloroethyl)-phosphate | |
| 0.5 g of stabilizer L 5340 according to Example 2 | |
| 4.0 g of dimethylbenzylamine | } Component III |
| 1.0 g of amine catalyst according to Example 1 | |
| 30.0 g of trichlorofluoromethane | |

Foaming was carried out as in Example 1.

$t_R$: 20 sec., $t_L$: 42 sec., $t_A$: 90 sec., Gross density [kg/m$^3$]: 61 Compression resistance [MPa]: 0.12

EXAMPLE 7

| | |
|---|---|
| 100 g of polyisocyanate $A_1$ | } Component I |
| 200 g of silicate component $B_2$ | |
| 10 g of polyether $C_4$ | } Component II |
| 15 g of tris-($\beta$-chloroethyl)-phosphate | |
| 1 g of stabilizer according to Example 2 | } Component III |
| 0.5 g of dimethylbenzylamine | |
| 25 g of trichlorofluoromethane | |

Foaming was carried out as in Example 1. A tough-elastic inorganic-organic lightweight foam characterized by the following data is obtained:

$t_R$: 20 sec., $t_L$: 34 sec., $t_A$: 140 sec..

Conventional mixing of all three components at the same time results in inhomogeneous reaction mixtures which cannot be foamed.

Other inorganic-organic foams produced according to Example 7 are represented in Table 1.

The symbols have the following meanings:
TCAP: tris-($\beta$-chloroethyl)-phosphate
$R_{11}$: trichlorofluoromethane
L 5340: polyether siloxane of Union Carbide Corp.
DB: dimethylbenzylamine

Table 1

| Example No. | Component I Polyisocyanate Type | (g) | Component I Silicate Component Type | (g) | Component II Polyether C$_4$ (g) | Component III TCAP (g) | L5340 (g) | DB (g) | Amine catalyst* (g) | R$_{11}$ (g) | t$_R$ (sec) | t$_L$ (sec) | t$_A$ (sec) | Gross density (kg/m$^3$) | Compression resistance MPa |
|---|---|---|---|---|---|---|---|---|---|---|---|---|---|---|---|
| 8 | A$_1$ | 100 | B$_3$ | 300 | 10 | 15 | 1.0 | 0.5 | 0.2 | 30 | 20 | 27 | 105 | 71 | 0.24 |
| 9 | A$_1$ | 100 | B$_2$ | 300 | 10 | 15 | 1.0 | 1.0 | — | 30 | 20 | 20 | 125 | 62 | 0.18 |
| 10 | A$_1$ | 100 | B$_1$ | 300 | 10 | 15 | 1.0 | 3.0 | 1.0 | 30 | 20 | 31 | 80 | 57 | 0.09 |
| 11 | A$_1$ + 100 g Lafarge cement | 100 | B$_1$ | 300 | 10 | 15 | 1.0 | 3.0 | 1.0 | 30 | 20 | 31 | 80 | 72 | 0.11 |

*according to Example 1

EXAMPLE 12

100 g of polyisocyanate A$_1$ } Component I 300 g of silicate component B$_1$
10 g of Polyether C$_5$ } Component II 15 g of tris-(β-chloroethyl)-phosphate
1.0 g of stabilizer L 5340 according to Example 2
3.0 g of dimethylbenzylamine
1.0 g of amine catalyst according to Example 1
30.0 g of trichlorofluoromethane
} Component III Components II and III were mixed together. Component I was mixed by means of a high speed stirrer for 10 seconds to form a primary dispersion and the previously prepared mixture of components II+III was then added within 5 seconds with stirring. After a total mixing time of 20 seconds, the reaction mixture was poured out into paper packets. It began to foam up after 37 seconds and was solidified after 40 seconds. A tough elastic inorganic-organic lightweight foam having a gross density of 48 kg/m$^3$ and a compression resistance of 0.09 [MPa] was obtained.

Other inorganic-organic foams prepared according to Example 12 are represented in Table 2.

-continued

Example 1
30.0 g of trichlorofluoromethane

*Unsaturated polyester resin of Bayer AG

Components II and III were first mixed. Component I was mixed by means of a high speed stirrer for 10 seconds to form the primary dispersion. The previously prepared mixture of components II+III was then added within 5 seconds with stirring. After a total mixing time of 20 seconds, the reaction mixture was poured out into a paper packet. It began to foam up after 34 seconds and was solidified after 90 seconds. A tough elastic inorgaic-organic lightweight foam having a gross density of 47 kg/m$^3$ and compression resistance of 0.10 [MPa] was obtained.

EXAMPLE 19

400 g of polyisocyanate A$_2$
100 g of trichlorofluoromethane
0.2 g of stabilizer L 5340 according to Example 2
600 g of silicate component B$_1$
} Component I 0.2 g of emulsifier (sodium salt of a sulphochlorinated paraffin mixture of C$_{10}$–C$_{14}$)
} Component II

Table 2

| Example No. | Component I Polyisocyanate Type | (g) | Component I Silicate component Type | (g) | Component II Polyether Type | (g) | Component III TCAP L5340 (g) | (g) | DB | Amine catalyst* (g) | R$_{11}$ (g) | t$_R$ (sec) | t$_L$ (sec) | t$_A$ (sec) | Gross density (kg/m$^3$) | Compression resistance (MPa) |
|---|---|---|---|---|---|---|---|---|---|---|---|---|---|---|---|---|
| 13 | A$_1$ | 100 | B$_3$ | 200 | C$_5$ | 10 | 15 | 1.0 | 0.5 | — | 25 | 20 | 28 | 95 | 46 | 0.11 |
| 14 | A$_1$ | 100 | B$_1$ | 200 | C$_5$ | 10 | 15 | 1.0 | 1.0 | 1.0 | 25 | 20 | 32 | 80 | 34 | 0.07 |
| 15 | A$_1$ | 100 | B$_3$ | 300 | C$_5$ | 10 | 15 | 1.0 | 0.5 | 0.2 | 30 | 20 | 27 | 110 | 58 | 0.13 |
| 16 | A$_1$ + 100 g Lafarge cement | 100 | B$_1$ | 300 | C$_5$ | 10 | 15 | 1.0 | 3.0 | 1.0 | 30 | 20 | 40 | 87 | 73 | 0.14 |
| 17 | A$_1$ | 100 | B$_1$ | 500 | C$_6$ | 15 | 15 | 1.0 | 3.0 | 1.0 | 40 | 20 | 42 | 110 | 80 | 0.09 |

*according to Example 1

EXAMPLE 18

100 g of polyisocyanate A$_1$ } Component I 300 g of silicate component B$_2$
10 g of polyether C$_5$
1.0 g of Lequval SF38*
1.0 g of benzoyl peroxide
} Component II 1.5 g of tris-(β-chloroethyl)-phosphate
1.0 g of stabilizer L 5340 according to Example 2
3.0 g of dimethylbenzylamine
1.0 g of amine catalyst according to
} Component III 120 g of formose D$_1$
3 g of triethylamine
} Component III Components I and II were mixed together for 5 seconds by means of a high speed stirrer to form the primary dispersion. Component III was subsequently added within 5 seconds with stirring. After a total mixing time of 20 seconds, the reaction mixture was poured out into a paper packet. A hard, heavy foam which was characterized by the following data was obtained:

$t_R$: 20, $t_L$: 30, $t_A$: 53 Gross density [kg/m$^3$]: 212 Compression resistance [MPa]: 0.60.

Conventional mixing of all three components at the same time results within 20 seconds in an inhomogeneous, highly viscous reaction mixture which cannot be foamed.

EXAMPLE 20

| | |
|---|---|
| 4000 g of polyisocyanate A$_2$ | |
| 1 g of stabilizer L 5340 according to Example 2 | Component I |
| 800 g of trichlorofluoromethane | |
| 6000 g of silicate component B$_1$ | |
| 1 g of emulsifier according to Example 19 | Component II |
| 1200 g of formose D$_1$ | |
| 27 g of triethylamine | Component III |

As in Example 19, components I+II were first mixed by means of a high speed stirrer and component III was then added within 5 seconds with stirring. After 30 seconds vigorous mixing, the reaction mixture was poured out into a wooden box mold which had a capacity of ca. 55 dm$^3$. The mixture began to foam up after 48 seconds and was solidified after 70 seconds. A hard inorganic-organic foam having a gross density of 169 kg/m$^3$ and a compression resistance of 0.57 [MPa] was obtained.

EXAMPLE 21

| | |
|---|---|
| 400 g of polyisocyanate A$_3$ | |
| 85 g of trichlorofluoromethane | |
| 0.2 g of stabilizer L 5340 according to Example 2 | Component I |
| 600 g of silicate component B$_1$ | |
| 0.2 g of emulsifier according to Example 19 | Component II |
| 120 g of formose D$_1$ | |
| 3.0 g of triethylamine | Component III |

Foaming was carried out as in Example 19.

$t_R$: 20 sec., $t_L$: 30 sec., $t_A$: 50 sec. Gross density [kg/m$^3$]: 255 Compression resistance [MPa]: 0.58

EXAMPLE 22

| | |
|---|---|
| 400 g of polyisocyanate A$_2$ | |
| 100 g of trichlorofluoromethane | |
| 0.2 g of stabilizer L 5340 according to Example 2 | Component I |
| 600 g of silicate component B$_1$ | |
| 0.2 g of emulsifier according to Example 19 | |
| 300 g of molten alumina cement "Lafarge Fondu" | Component II |
| 120 g of formose D$_1$ | |
| 3.0 g of triethylamine | Component III |

Foaming was carried out as in Example 19.

$t_R$: 20 sec., $t_L$: 29 sec., $t_A$: 55 sec. Gross density [kg/m$^3$]: 229 Compression resistance [MPa]: 0.42

EXAMPLE 23

| | |
|---|---|
| 400 g of polyisocyanate A$_2$ | |
| 100 g of trichlorofluoromethane | |
| 0.2 g of stabilizer L 5340 according to Example 2 | Component I |
| 600 g of silicate component B$_1$ | |
| 0.2 g of emulsifier according to Example 19 | Component II |
| 120 g of formose D$_1$ | |
| 500 g of suspension E$_1$ | |
| 3 g of triethylamine | Component III |

Foaming was carried out as in Example 19.

$t_R$: 20 sec., $t_L$: 31 sec., $t_A$: 65 sec. Gross density [kg/m$^3$]: 166 Compression resistance [MPa]: 0.37

EXAMPLE 24

A dispersion of waterglass (50% solid content) and polyisocyanate A$_1$ is prepared in a first stirrer vessel and a mixture M of the following composition is then added in a second stirrer vessel:

100 parts by weight of polyether (polypropylene oxide started on ethylene diamine, OH number=450),
200 parts by weight of trichloroethylphosphate,
300 parts by weight of trichlorofluoromethane,
10 parts by weight of triethylamine and
10 parts by weight of silicone stabilizer (OS 710, sales product of Bayer AG).

The streams of products were adjusted as follows: Waterglass 8000 g/min, polyisocyanate 8040 g/min, 4920 g/min of mixture M. Both mixing apparatus had spiked stirrers rotating in a mixture chamber of about 300 ml at 3000 revs/min. The material was delivered by means of conventional gear wheel pumps.

A uniform, fine cellular foam having a gross density of 14 kg/m$^3$ was obtained. It could be produced continuously without difficulty to heights of up to 80 cm in a width of 100 cm.

EXAMPLE 25 (Comparison example)

Using the same streams of products as in Example 24, all the components were introduced simultaneously into a single mixing head. The foam obtained in this case is markedly heterogeneous and shows severe flow disturbances at the bottom and sides, reaching up to about 60% of the height of the block. The disturbances cannot be overcome by increasing the speed of the stirrer to 6000 revs/min. The addition of more stabilizer does not produce any marked improvement but results in rapidly shrinking foams.

EXAMPLE 26

Using the same rates of flow of products as in Example 24, a dispersion of waterglass and isocyanate is first prepared in a mixing apparatus as in Example 24. This dispersion is fed into a static mixer where it is mixed with mixture M. The foam obtained is equal in quality to that of Example 24.

What is claimed is:

1. A process for the production of inorganic-organic synthetic foam materials having high strength, elasticity, dimensional stability under heat, and flame resistance, consisting of a polymer-polysilicic acid gel composite material in the form of a solid/solid xerosol, said process comprising mixing (a) an organic polyisocyanate,
(b) an aqueous basic solution and/or an aqueous basic suspension having an inorganic solid content of from 20 to 80% by weight, preferably from 30 to 70% by weight, (c) an organic compound containing at least one isocyanate reactive hydrogen atom and at least one non-ionic-hydrophilic group and (d) optionally catalysts and other additives and leaving the resulting mixture to react, characterized in that components (a) and (b), optionally with the addition of part or all of component (d) are first mixed together to form a stable primary dispersion and thereafter component (c), optionally with the addition of all or part of component (d), is added to form the final dispersion which is allowed to foam.

2. The process of claim 1, characterized in that aqueous alkali metal silicate solutions or aqueous silica sols are used as the aqueous basic solution or suspension.

3. The process of claim 2, characterized in that the alkali metal silicate used is sodium silicate having an $Na_2O:SiO_2$ molar ratio in the region of 1:1.6 to 1:3.3.

4. The process of claim 3, characterized in that the polyisocyanates used are phosgenation products of aniline-formaldehyde condensation.

5. The process of claim 3, characterized in that the polyisocyanate used is a polyisocyanate containing ionic groups.

6. The process of claim 5, characterized in that the polyisocyanate containing ionic groups is a polyisocyanate containing sulphonic acid and/or sulphonate groups.

7. The process of claim 3, characterized in that the polyisocyanate used is a prepolymer having isocyanate end groups and containing non-ionic hydrophilic groups.

8. An inorganic-organic synthetic material obtainable according to claim 1 consisting of 10 to 50% by weight of inorganic aqueous phase and 90 to 50% by weight of organic phase.

* * * * *

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch Rainer Welte It is certified that error appears in the above—identified patent and that said Letters Patent are hereby corrected as shown below:

At column 1, line 25 please change "in" to --is--.

At column 8, line 14, "tetraaalcohol" should read --tetraalcohol--.

At column 12, line 29, "inorgaic-organic" should read--inorganic-organic--.

At column 12, line 41 "mixture of $C_{10}-C_{14}$" should be corrected to read --mixture $C_{10}-C_{14}$--.

At column 13, line 45, " $[kg/m^3]$ : 255" should be corrected to read $[kg/m^3]$ : 225--.

At column 14, line 30, "mixture chamber" should read --mixing chamber--.

In the Examples section of the above identified patent, the following changes in the format of each chart more clearly identify the ingredients of the specific component groups.

UNITED STATES PATENT AND TRADEMARK OFFICE
CERTIFICATE OF CORRECTION

PATENT NO. : 4,198,487

DATED : April 15, 1980

INVENTOR(S) : Hans-Joachim Scholl, Dieter Dieterich, Peter Markusch, Rainer Welte It is certified that error appears in the above—identified patent and that said Letters Patent are hereby corrected as shown below:

EXAMPLE 1

100 g of polyisocyanate $A_1$ ) 
300 g of silicate component $B_1$ )    Component I 5 g of polyether $C_1$ ) 
5 g of polyether $C_2$ )    Component II 15 g of tris ($\beta$-chloroethyl)-phosphate )

0.2 g of stabilizer 05-170 (Polyether siloxane of Bayer AG) )

3 g of dimethylbenzylamine )    Component III 1 g of amine catalyst (consisting of 75% by weight of N,N-dimethyl aminoethanol and 25% by weight of diazobicyclooctane )

25 g of trichlorofluoromethane )

UNITED STATES PATENT AND TRADEMARK OFFICE
CERTIFICATE OF CORRECTION

PATENT NO. : 4,198,487

DATED : April 15, 1980

INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 2

100 g of polyisocyanate $A_1$ ) 
200 g of silicate component $B_1$ ) Component I 5 g of polyether $C_1$ )
5 g of polyether $C_2$ ) Component II 15 g of tris-($\beta$-chloroethyl)-phosphate )
0.5 g of stabilizer L 5340 (polyether siloxane of Union Carbide Corp.) )
3 g of dimethylbenzylamine ) Component III
1 g of amine catalyst according to Example 1 )
25 g of trichlorofluoromethane )

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 4

100 g of polyisocyanate $A_1$ ) 
300 g of silicate component $B_1$ ) Component I 5 g of polyether $C_1$ ) 
5 g of polyether $C_2$ ) Component II 15 g of tris-(β-chloroethyl)-phosphate )
0.5 g of stabilizer L 5340 of Example 2 )
3.0 g of dimethylbenzylamine ) Component III
1.0 g of amine catalyst of Example 1 )
30 g of trichlorofluoromethane )

UNITED STATES PATENT AND TRADEMARK OFFICE
CERTIFICATE OF CORRECTION

PATENT NO. : 4,198,487          Page 5 of 11
DATED      : April 15, 1980
INVENTOR(S): Hans-Joachim Scholl, Dieter Dieterich,
             Peter Markusch, Rainer Welte It is certified that error appears in the above—identified patent and that said Letters Patent are hereby corrected as shown below:

EXAMPLE 5

100 g of polyisocyanate $A_1$         ) 
300 g of silicate component $B_3$     )  Component I 5 g of polyether $C_1$                )
5 g of polyether $C_2$                )  Component II 15 g of tris-(β-chloroethyl)-phosphate     )
0.5 g of stabilizer L5340 according to     )
       Example 2                           )
                                           )  Component III
1.5 g of dimethylbenzylamine               )
1.0 g of amine catalyst according to       )
       Example 1                           )
30 g of trichlorofluoromethane             )

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 6

100 g of polyisocyanate $A_1$ ⎫
300 g of silicate component $B_1$ ⎬ Component I
100 g of alumina cement "Lafarge Fondu" ⎭

5 g of polyether $C_1$ ⎫
5 g of polyether $C_2$ ⎬ Component II 15 g of tris-($\beta$-chloroethyl)-phosphate ⎫
0.5 g of stabilizer L 5340 according to Example 2 ⎪
4.0 g of dimethylbenzylamine ⎬ Component III
1.0 g of amine catalyst according to Example 1 ⎪
30.0 g of trichlorofluoromethane ⎭

UNITED STATES PATENT AND TRADEMARK OFFICE
CERTIFICATE OF CORRECTION

PATENT NO. : 4,198,487  
DATED : April 15, 1980  
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 7

100 g of polyisocyanate $A_1$ ) 
200 g of silicate component $B_2$ )    Component I 10 g of polyether $C_4$ )    Component II 15 g of tris-(β-chloroethyl)-phosphate )
1 g of stabilizer according to Example 2 )
0.5 g of dimethylbenzylamine )    Component III
25 g of trichlorofluoromethane )

EXAMPLE 12

100 g of polyisocyanate $A_1$ )
300 g of silicate component $B_1$ )    Component I 10 g of polyether $C_5$ )    Component II 15 g of tris-(β-chloroethyl)-phosphate )
1.0 g of stabilizer L 5340 according to Example 2 )
3.0 g of dimethylbenzylamine )    Component III
1.0 g of amine catalyst according to Example 1 )
30.0 g of trichlorofluoromethane )

UNITED STATES PATENT AND TRADEMARK OFFICE
CERTIFICATE OF CORRECTION

PATENT NO. : 4,198,487

DATED : April 15, 1980

INVENTOR(S) : Hans-Joachim Scholl, Dieter Dieterich, Peter Markusch, Rainer Welte It is certified that error appears in the above—identified patent and that said Letters Patent are hereby corrected as shown below:

EXAMPLE 18

| | |
|---|---|
| 100 g of polyisocyanate $A_1$ | Component I |
| 300 g of silicate component $B_2$ | |
| | |
| 10 g of polyether $C_5$ | Component II |
| 1.0 g of Lequval SF38* | |
| 1.0 g of benzoyl peroxide | |
| | |
| 1.5 g of tris-($\beta$-chloroethyl)-phosphate | Component III |
| 1.0 g of stabilizer L 5340 according to Example 2 | |
| 3.0 g of dimethylbenzylamine | |
| 1.0 g of amine catalyst according to Example 1 | |
| 30 g of trichlorofluoromethane | |

*Unsaturated polyester resin of Bayer AG

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 19

400 g of polyisocyanate $A_2$ ) 
100 g of trichlorofluoromethane ) Component I
0.2 g of stabilizer L 5340 according to Example 2 )

600 g of silicate component $B_1$ )
0.2 g of emulsifier (sodium salt of a sulphochlorinated paraffin mixture $C_{10}$-$C_{14}$) ) Component II 120 g of formose $D_1$ )
3 g of triethylamine ) Component III

EXAMPLE 20

4000 g of polyisocyanate $A_2$ )
1 g of stabilizer L 5340 according to Example 2 ) Component I
800 g of trichlorofluoromethane )

6000 g of silicate component $B_1$ )
1 g of emulsifier according to Example 19 ) Component II 1200 g of formose $D_1$ )
27 g of triethylamine ) Component III

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 21

400 g of polyisocyanate $A_3$ ) 
85 g of trichlorofluoromethane ) Component I
0.2 g of stabilizer L 5340 according to Example 2 )

600 g of silicate component $B_1$ )
0.2 g of emulsifier according to Example 19 ) Component II 120 g of formose $D_1$ )
3.0 g of triethylamine ) Component III

EXAMPLE 22

400 g of polyisocyanate $A_2$ )
100 g of trichlorofluoromethane ) Component I
0.2 g of stabilizer L 5340 according to Example 2 )

600 g of silicate component $B_1$ )
0.2 g of emulsifier according to Example 19 ) Component II
300 g of molten alumina cement "Lafarge Fondu" )

120 g of formose $D_1$ )
3.0 g of triethylamine ) Component III

UNITED STATES PATENT AND TRADEMARK OFFICE
CERTIFICATE OF CORRECTION

PATENT NO. : 4,198,487
DATED : April 15, 1980
INVENTOR(S) : Hans-Joachim Scholl, Dieter Dieterich, Peter Markusch, Rainer Welte It is certified that error appears in the above-identified patent and that said Letters Patent are hereby corrected as shown below:

EXAMPLE 23

400 g of polyisocyanate $A_2$           )
100 g of trichlorofluoromethane         )  Component I
0.2 g of stabilizer L 5340 according    )
       to Example 2                     )

600 g of silicate component $B_1$       )
0.2 g of emulsifier according           )  Component II
       to Example 19                    )

120 g of formose $D_1$                  )
500 g of suspension $E_1$               )  Component III
3 g of triethylamine                    )

Signed and Sealed this

Twenty-second Day of September 1981

[SEAL]

Attest:

GERALD J. MOSSINGHOFF

Attesting Officer   Commissioner of Patents and Trademarks